United States Patent [19]

Hashimoto

[11] Patent Number: 4,953,201
[45] Date of Patent: Aug. 28, 1990

[54] ADDITIONAL TELEPHONE EQUIPMENT AND METHOD FOR PROTECTING AGAINST NUISANCE CALLS

[75] Inventor: Kazuo Hashimoto, Tokyo, Japan

[73] Assignee: Hashimoto Corporation, Tokyo, Japan

[21] Appl. No.: 388,026

[22] Filed: Aug. 1, 1989

[30] Foreign Application Priority Data

Aug. 5, 1988 [JP] Japan ................. 63-195386

[51] Int. Cl.$^5$ ............................................ H04M 1/66
[52] U.S. Cl. ................................ 379/189; 379/352; 379/199
[58] Field of Search ............. 379/188, 199, 200, 189, 379/352

[56] References Cited

U.S. PATENT DOCUMENTS

| | | | |
|---|---|---|---|
| 3,033,941 | 5/1962 | Bell et al. | 379/199 X |
| 4,266,098 | 5/1981 | Novak | 379/199 X |
| 4,387,272 | 6/1983 | Castro et al. | 379/199 X |

FOREIGN PATENT DOCUMENTS 47-128078 10/1973 Japan .

Primary Examiner—James L. Dwyer
Attorney, Agent, or Firm—Lowe, Price, LeBlanc, Becker & Shur

[57] ABSTRACT

An additional piece of telephone equipment for protecting against nuisance calls as a substitute for a telephone answering device, wherein after the equipment is engaged upon reception of an incoming call, one or the other of a dummy busy tone or a dummy ringback tone is randomly sent out to a calling party, so that it is possible to inform the calling party in a natural way that a called party cannot answer the calling party now. At this time, according to an even or odd number of value of a counter in a microprocessor (CPU), the dummy busy tone or the dummy ringback tone is sent out, and for this purpose, a random-number command stored in the program is used to select the above even or odd number.

5 Claims, 2 Drawing Sheets

4,953,201

ADDITIONAL TELEPHONE EQUIPMENT AND METHOD FOR PROTECTING AGAINST NUISANCE CALLS

BACKGROUND OF THE INVENTION

The present invention relates to an additional telephone equipment and method for protecting against nuisance calls.

A conventional simple additional telephone equipment which can take the place of an automatic answering telephone device has already been proposed in the prior art, for example, JAPAN S48-75106 A (Serial No. S47-128078). This equipment generates a dummy busy tone, after a telephone line is engaged in response to an incoming call, to cause the calling party not to call again temporarily.

However, in the above example of the prior art, the calling party is caused to hear only the dummy busy signals at all times after engaging of telephone line. Thus, the general calling party is made to believe that this busy signal is tricky and artificial and does not try to call again.

SUMMARY OF THE INVENTION

It is an object of the present invention to provide an additional telephone equipment for protecting against nuisance calls, wherein one or the other of a dummy busy tone or a dummy ringback tone is sent out irregularly in accordance with the state of an internal circuit when an incoming call is received, especially according to the condition of whether the random output of a counter circuit is an even or odd number, so that the dummy busy tone is sent out in case of the even number and the ring back tone is sent out in case of the odd number.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

An embodiment of the present invention will be described in the following in connection with its structure and operations.

Figure 1:
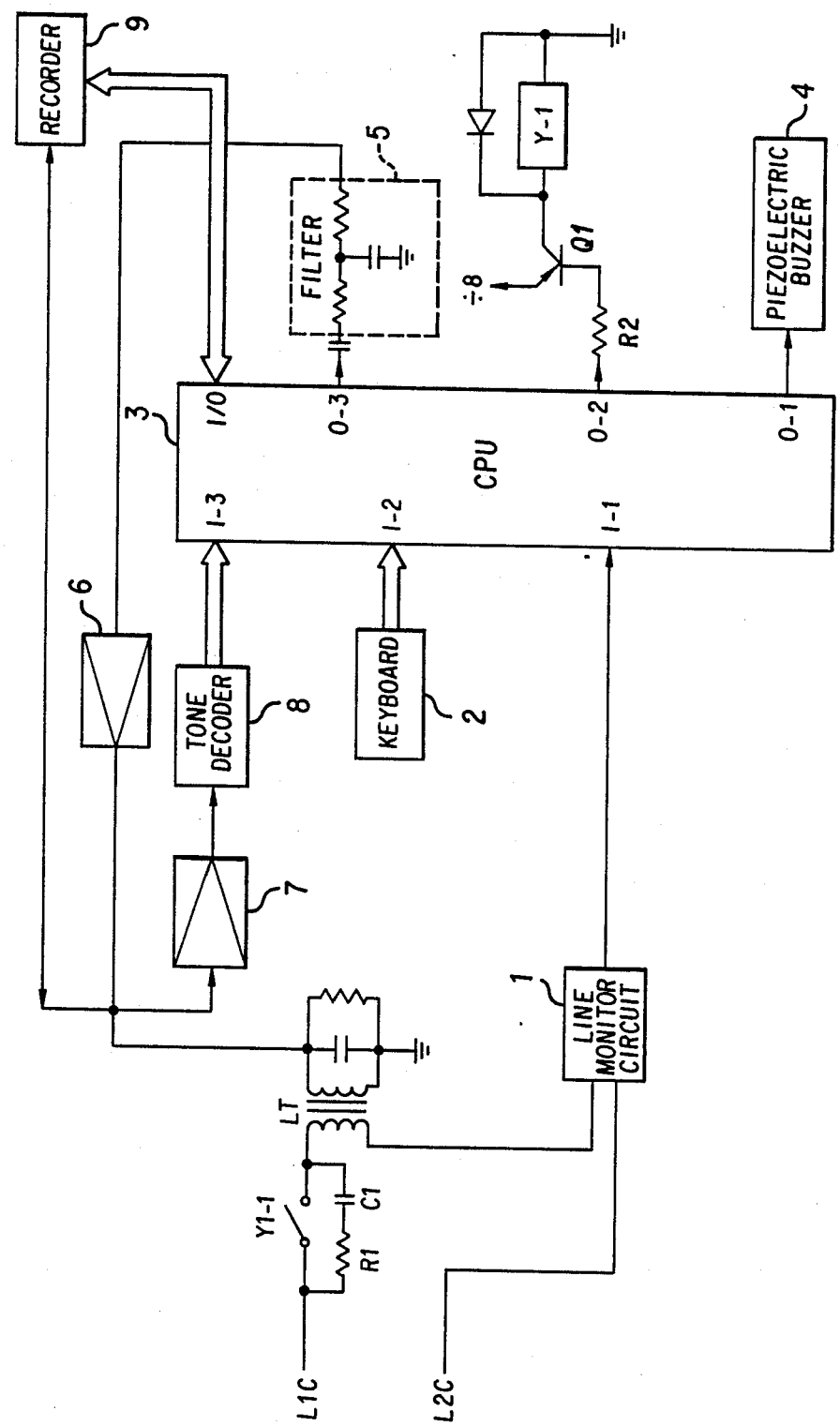
FIG. 1 is a circuit diagram showing the principle of the present invention.

In FIG. 1: reference characters L1 and L2 designate telephone lines; numeral 1 designates a line monitor circuit which is composed mainly of a photocoupler for detecting a ringing signal and the hangup of a calling party (or the on-hook of the telephone); and numeral 2 designates a keyboard having a variety of keys for setting the present equipment in a standby mode for controlling a recorder 9. Designated at numeral 3 is a one-chip microprocessor (which will be shortly referred to as a "CPU") which has input ports I-1, I-2 and I-3, output ports 0-1, 0-2 and 0-3, and an input/output port I/O. Numeral 4 designates a piezoelectric buzzer for indicating the incoming call. Numeral 5 designates a filter 5 for transforming the dummy busy tone (or ringing signal) or ringback tone into sine waves to reduce its distortion components because the dummy busy tone or ringback tone has square waves prepared by the aforementioned program and therefore produces distortion. Numerals 6 and 7 designate amplifiers; numeral 8 designates a tone decoder for decoding the tone (i.e., DTMF tone) of a "push phone" (which is the trade name of a push-button telephone) sent out by the calling party; and the numeral 9 designates a recorder using a memory IC. Incidentally, the aforementioned dummy busy tone or dummy ringback tone may be generated not only by the program but also by the speech synthesis.

Figure 2:
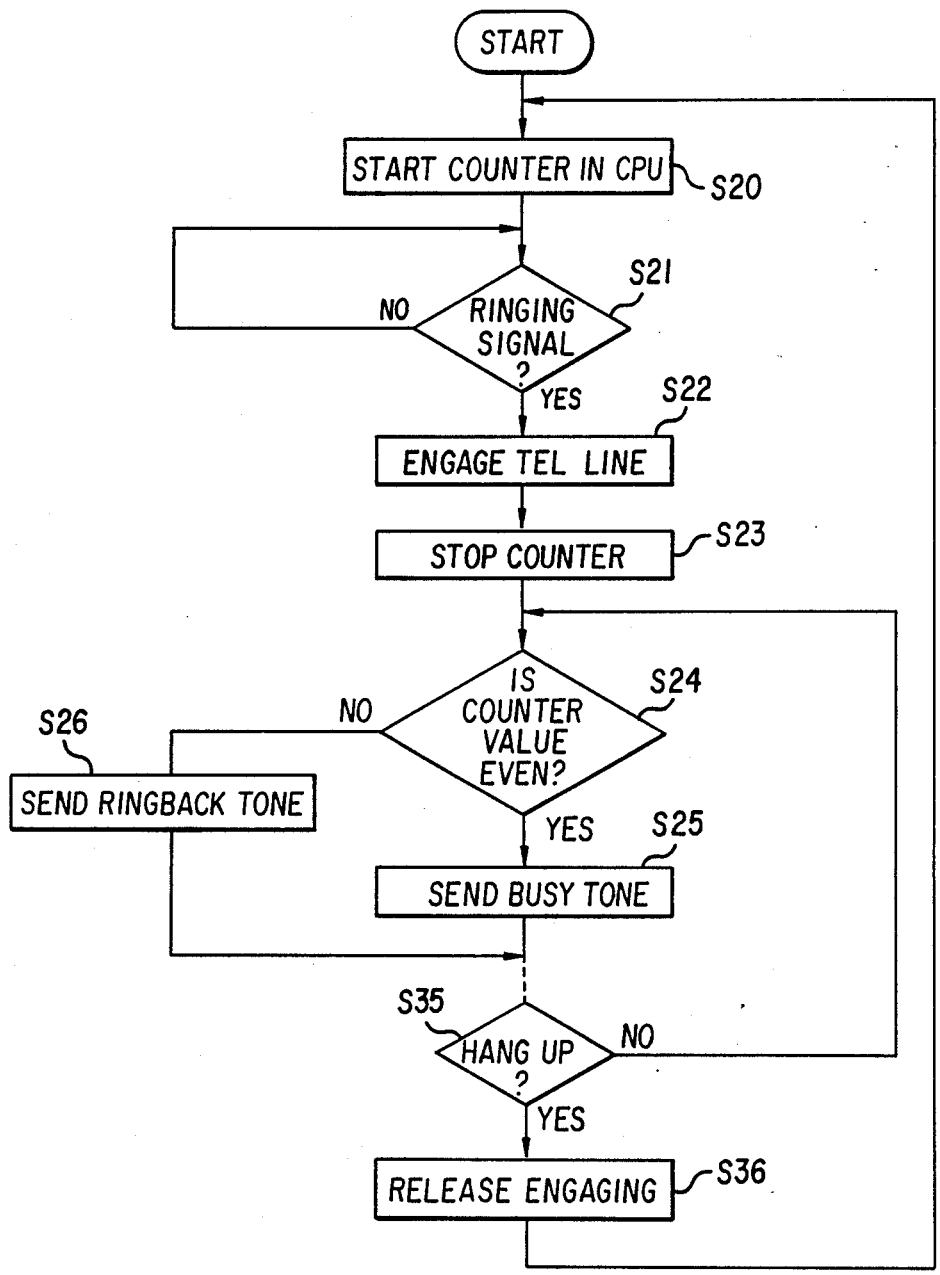
FIG. 2 is a flow chart showing the operation thereof.

Next, the specific operations will be described in the following with reference to the flow chart of FIG. 2. At first Step S20, a 8-bit counter built in the CPU is started. Here, the CPU 8048 of Intel may be used because it has two 8-bit counters built therein.

At the next Step S21, it is tested through the input port I-1 whether or not a calling signal has come in the line monitor circuit 1. If the calling signal comes in, the Step S21 is YES, and the routine advances to subsequent Step S22. At this Step S22, the output port 0-2 is switched from the H to L level to hold a transistor Q1 ON through a resistor R2. As a result, a load relay Y-1 is turned ON to engage the telephone lines L1 and L2 through its contact y1-1 so that the calling signal is interrupted to establish an off-hook mode.

At next Step S23, the counter in the free running state is stopped. It is tested at subsequent Step S24 whether the value of the counter is even or odd. The routine is transferred to Step S25, if YES, i.e., if the counter value is even, and to Step S26, if NO is odd, to send out the ringback tone.

Here, the dummy busy tone and dummy ringback tone described above are prepared by the program and are sent out to the calling party through the amplifier 6 and the line transformer LT after they have been transformed into sinusoidal forms by the filter 5, because their waveforms are square and therefore produce distortions.

Those tones are continuously sent out until the calling party hangs up at Step S35. Meanwhile, however, a specific code from the calling party, for example, can be determined through the tone decoder 8 to switch the recorder 9 to the recording or reproducing mode.

Now, if hang-up of the calling party is detected at the Step S35, the engaging of the telephone line is released (at Step S36) to return the routine to the Step S20 so that the aforementioned counter may be restarted to await a subsequent incoming call. Since, however, the time period from the Step S20 through the Step S23 to the Step S24 is indefinite for each call, the counter value at Step S24 is also indefinite so that its output value takes a random number.

In case, therefore, a high-level language such as the Basic language is used in the program of the CPU, a random command can be used to generate the above-specified output.

On the other hand, the dummy busy tone or dummy ringback tone generated in the aforementioned program can be replaced by a speech synthesizing IC which is stored with the data of those tones. In this case, the start signal is applied after the address for the ringback or busy tone has been designated by the nonshown output port, and the output of the speech synthesis generated at this time is introduced to the amplifier 6.

Now, the calling party hears the dummy ringback tone sent from the present equipment, after having heard the ringback tone sent from the station, and these tones should naturally be synchronized. It is therefore assumed that the calling signal and the ringback tone of the station be synchronous (not always so depending upon the exchanger). A first calling signal comes in, and a subsequent calling signal comes in for an interruption period of 2 seconds, that is, the calling signal continues in 16 Hz for 1 sec. At the first wave of 16 Hz, the telephone line is engaged to send out the dummy ringback tone promptly. In other words, the dummy busy tone to be sent out is a repetition of continuations of 0.5 sec. and interruptions of 0.5 sec. of the signal of 400 Hz.

As has been described hereinbefore, according to the present invention, one or the other of the busy tone or the ringback tone is irregularly sent out after reception of the incoming call so that the calling party can be, not artificially, but naturally, informed of the fact that he cannot ring up on the telephone. Thus, the present equipment can be simply provided not by the automatic answering telephone set as a whole so that the present invention can have a high practical effect.

Although a certain preferred embodiment has been shown and described, it should be understood that many changes and modifications may be made therein without departing from the scope of the invention.

What is claimed:

1. An additional telephone equipment for protecting against nuisance calls, comprising:
    means responsive to an incoming call for engaging a telephone line;
    means for generating, selectively, a dummy busy tone or a dummy ringback tone on the telephone line immediately after engaging;
    means for generating an output counter value;
    means for selecting an even or odd number of the counter value; and
    means responsive to said even or odd number for sending out said dummy busy tone or said dummy ringback tone after engaging.

2. An additional telephone equipment for protecting against nuisance calls, according to claim 1, including a random-number signal obtained from a high-level language program executed by a microprocessor and stored for selecting said even or odd number.

3. A method of protecting against nuisance calls, comprising the steps of:
    engaging a telephone line in response to an incoming call;
    generating a variable count value;
    determining whether the count value is a first value or a second value, and in response;
    generating on the telephone line one or the other of a dummy busy tone or a dummy ringback tone after engaging.

4. The method of claim 3, wherein said first and second values are, respectively, an even value and an odd value.

5. The method of claim 4, including storing a random-number command signal to select said even or odd value, obtained from a high-level language executed by a microprocessor.

* * * * *